(12) United States Patent
Razzell et al.

(10) Patent No.: US 11,078,802 B2
(45) Date of Patent: Aug. 3, 2021

(54) TURBINE ENGINE ASSEMBLY WITH CERAMIC MATRIX COMPOSITE COMPONENTS AND END FACE SEALS

(71) Applicant: Rolls-Royce plc, London (GB)

(72) Inventors: Anthony G. Razzell, London (GB); Michael J. Whittle, London (GB); Steven Hillier, London (GB)

(73) Assignee: Rolls-Royce plc

( * ) Notice: Subject to any disclaimer, the term of this patent is extended or adjusted under 35 U.S.C. 154(b) by 222 days.

(21) Appl. No.: 16/409,231

(22) Filed: May 10, 2019

(65) Prior Publication Data

US 2020/0355089 A1   Nov. 12, 2020

(51) Int. Cl.
*F01D 11/00*    (2006.01)
*F16J 15/3284*  (2016.01)

(52) U.S. Cl.
CPC .... *F01D 11/005* (2013.01); *F05D 2300/6033* (2013.01); *F16J 15/3284* (2013.01)

(58) Field of Classification Search
CPC .... F01D 11/005; F01D 11/008; F01D 25/246; F05D 2240/11
See application file for complete search history.

(56) References Cited

U.S. PATENT DOCUMENTS

| | | | |
|---|---|---|---|
| 3,970,318 A | 7/1976 | Tuley | |
| 4,537,024 A | 8/1985 | Grosjean | |
| 5,167,485 A * | 12/1992 | Starkweather | F01D 11/005 415/115 |
| 6,270,311 B1 | 8/2001 | Kuwabara et al. | |
| 7,090,224 B2 | 8/2006 | Iguchi et al. | |
| 7,527,472 B2 * | 5/2009 | Allen | F01D 11/008 277/648 |
| 7,740,080 B2 | 6/2010 | Fenton | |
| 7,798,769 B2 | 9/2010 | Keller | |
| 8,257,029 B2 * | 9/2012 | Habarou | F01D 11/125 415/135 |
| 8,276,649 B2 | 10/2012 | Gagnon, Jr. et al. | |
| 8,430,626 B1 * | 4/2013 | Liang | F02C 7/28 415/139 |
| 8,821,114 B2 | 9/2014 | Afanasiev et al. | |
| 9,416,675 B2 * | 8/2016 | Lacy | F16J 15/02 |
| 9,757,920 B2 | 9/2017 | Lazur | |
| 10,190,434 B2 * | 1/2019 | Westphal | F01D 5/02 |
| 10,718,226 B2 * | 7/2020 | Vetters | F01D 25/005 |
| 2008/0050236 A1 * | 2/2008 | Allen | F01D 11/008 416/190 |
| 2009/0110546 A1 * | 4/2009 | Tholen | F01D 11/08 415/173.3 |
| 2010/0092281 A1 * | 4/2010 | Habarou | F01D 11/125 415/200 |
| 2015/0211377 A1 * | 7/2015 | Lacy | F16J 15/02 277/590 |
| 2016/0032747 A1 * | 2/2016 | Bez | F01D 11/005 415/182.1 |

(Continued)

*Primary Examiner* — Eldon T Brockman
(74) *Attorney, Agent, or Firm* — Barnes & Thornburg LLP

(57) ABSTRACT

A gas turbine engine assembly includes a first component, a second component, and a seal. The first component is spaced apart from the second component to form a gap between the first component and the second component. The seal is configured to block gases from flowing in the gap between the first component and the second component.

17 Claims, 9 Drawing Sheets

(56) References Cited

U.S. PATENT DOCUMENTS

| | | | |
|---|---|---|---|
| 2016/0123171 A1* | 5/2016 | Westphal | F01D 25/243 |
| | | | 415/173.1 |
| 2016/0348523 A1 | 12/2016 | Thomas et al. | |
| 2017/0254271 A1 | 9/2017 | Hillier | |
| 2019/0153886 A1* | 5/2019 | Vetters | F01D 25/246 |
| 2020/0095880 A1* | 3/2020 | Clark | F01D 11/005 |
| 2020/0308973 A1* | 10/2020 | Clark | F01D 25/246 |

\* cited by examiner

TURBINE ENGINE ASSEMBLY WITH CERAMIC MATRIX COMPOSITE COMPONENTS AND END FACE SEALS

FIELD OF THE DISCLOSURE

The present disclosure relates generally to gas turbine engines, and more specifically to seal features for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may include components made from materials that have different coefficients of thermal expansion. Due to the differing coefficients of thermal expansion, the components expand at different rates during operation of the gas turbine engine. Such components may be used in gas path applications of the turbine.

For example, compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds and static vane assemblies positioned in the turbine may be exposed to high temperatures from products of the combustion reaction in the combustor. Such shrouds and static vane assemblies sometimes include components made from materials that have different coefficients of thermal expansion. Due to the differing coefficients of thermal expansion, the components of some turbine shrouds and static vane assemblies expand at different rates when exposed to combustion products.

SUMMARY

The present disclosure may comprise one or more of the following features and combinations thereof.

A gas turbine engine may include a first component comprising ceramic matrix composite materials, a second component comprising ceramic matrix composite, and a seal. The seal may be configured to block gases from flowing axially and radially between the first component and the second component.

In some embodiments, the first component may have a first radial outer surface and a first circumferential end face. The first radial outer surface may extend circumferentially partway around an axis. The first circumferential end face may extend radially inward from the first radial outer surface toward the axis.

In some embodiments, the second component may have a second radial outer surface and a second circumferential end face. The second radial outer surface may extend circumferentially partway around the axis. The second circumferential end face may extend radially inward from the second radial outer surface toward the axis. The second circumferential end face may be spaced apart circumferentially from the first circumferential end face of the first component to define a gap therebetween.

In some embodiments, the seal may include an outer segment and a radial segment. The outer segment may extend circumferentially along the first radial outer surface across the gap and along the second radial outer surface to allow for changes in a size of the gap due to thermal growth of the gas turbine engine assembly. The radial segment may extend radially inward from the outer segment into the gap.

In some embodiments, the seal may be T-shaped when viewed axially relative to the axis. In some embodiments, the seal may be H-shaped when viewed axially relative to the axis.

In some embodiments, the first component may include a radial innermost surface. The radial inner most surface may be spaced apart radially from the first radial outer surface toward the axis. The first circumferential end face may be planar and extend between and contact directly the first radial outer surface and the radial innermost surface of the first component.

In some embodiments, the first radial outer surface may be formed to define a plurality of first channels that extend radially into the first component. The second radial outer surface may be formed to define a plurality of second channels that extend radially into the second component. In some embodiments, the outer segment of the seal may cover the plurality of first channels and the plurality of second channels.

In some embodiments, the first component may include a radial innermost surface. The radial innermost surface may be spaced apart radially from the first radial outer surface toward the axis to define a boundary of a gas path of the gas turbine engine assembly.

In some embodiments, the radial segment may include an outer end and an inner end. The outer end may be coupled with the outer segment. The inner end may spaced apart radially from the outer end and the radial innermost surface to locate the inner end radially between the outer end and the radial innermost surface.

In some embodiments, the first component may include a radial innermost surface. The radial innermost surface may be spaced apart radially from the first radial outer surface toward the axis. In some embodiments, the first radial outer surface may be the outermost surface of the first component in a radial direction relative to the axis.

In some embodiments, the seal may include an outer end and an inner end. The inner end may be spaced apart radially from the outer end. The inner end may be radially flush with the radial innermost surface of the first component.

In some embodiments, the first radial outer surface may be formed to define a plurality of first channels that extend radially into the first component. The second radial outer surface may be formed to define a plurality of second channels that extend radially into the first component. In some embodiments, the outer segment of the seal may cover the plurality of first channels and the plurality of second channels.

In some embodiments, the seal may further include an inner segment. The inner segment may be spaced apart radially from the outer segment. The radial segment may extend between and connect directly the inner segment and the outer segment.

In some embodiments, the first radial outer surface may be formed to define a plurality of first channels that extend radially into the first component toward the axis. The second radial outer surface may be formed to define a plurality of second channels that extend radially into the first component toward the axis. The outer segment of the seal may cover the plurality of first channels and the plurality of second channels.

In some embodiments, the first component may include a fore ridge and an aft ridge. The aft ridge may be spaced apart axially from the fore ridge. The fore ridge and the aft ridge may extend radially outward away from the first radial outer surface.

In some embodiments, the fore ridge may extend circumferentially between a first end and a second end of the first component. The aft ridge may extend circumferentially between the first end and the second end of the first component.

According to another aspect of the present disclosure, a gas turbine engine assembly may include a first component comprising ceramic matrix composite materials, a second component comprising ceramic matrix composite materials, and a seal. The seal may be configured to block gases from flowing between the first component and the second component.

In some embodiments, the first component may extend circumferentially between a first end and second end thereof relative to an axis. In some embodiments, the second component may extend circumferentially between a first end and second end thereof relative to the axis. The first end of the second component may be spaced apart circumferentially from the second end of the first component to define a gap therebetween.

In some embodiments, the seal may include an outer segment, a first leg segment, and a second leg segment. The outer segment may extend circumferentially over the first radial outer surface, across the gap, and over the second radial outer surface. The first leg segment may extend radially inward from the outer segment toward the axis and engage the first component. The second leg segment may be spaced apart circumferentially from the first leg segment. The second leg segment may extend radially inward from the outer segment toward the axis and engage the second component.

In some embodiments, the first leg segment may be formed to include a first channel that extends radially outward into the first leg segment. The second leg segment may be formed to include a second channel that extends radially outward into the second leg segment. The first component may cover the first channel and the second component may cover the second channel.

In some embodiments, the first leg segment may include a mating surface that engages the first component. In some embodiments, the second leg segment may include a mating surface that engages the second component. The mating surface of the first leg segment and the mating surface of the second leg segment may be curvilinear to allow the seal to remain engaged with the first and second components in response to relative radially movement between the first component and the second component.

In some embodiments, the first component may include a radial outer surface and an axially extending ridge. The radial outer surface may engage the first leg segment. The axially extending ridge may be located at the second end of the first component.

In some embodiments, the axially extending ridge may further extend radially outward away from the first radial outer surface toward the outer segment of the seal into a space defined circumferentially between the first leg segment and the second leg segment. In some embodiments, the first leg segment may be spaced apart circumferentially from the axially extending ridge to allow the first component to move circumferentially relative to the second component.

In some embodiments, the first component may include a fore ridge and an aft ridge. The aft ridge may be spaced apart axially from the fore ridge. The fore ridge and the aft ridge may extend radially outward away from the first radial outer surface. In some embodiments, the fore ridge may extend circumferentially between the first end and the second end of the first component. The aft ridge may extend circumferentially between the first end and the second end of the first component.

These and other features of the present disclosure will become more apparent from the following description of the illustrative embodiments.

DETAILED DESCRIPTION OF THE DRAWINGS

Figure 1:
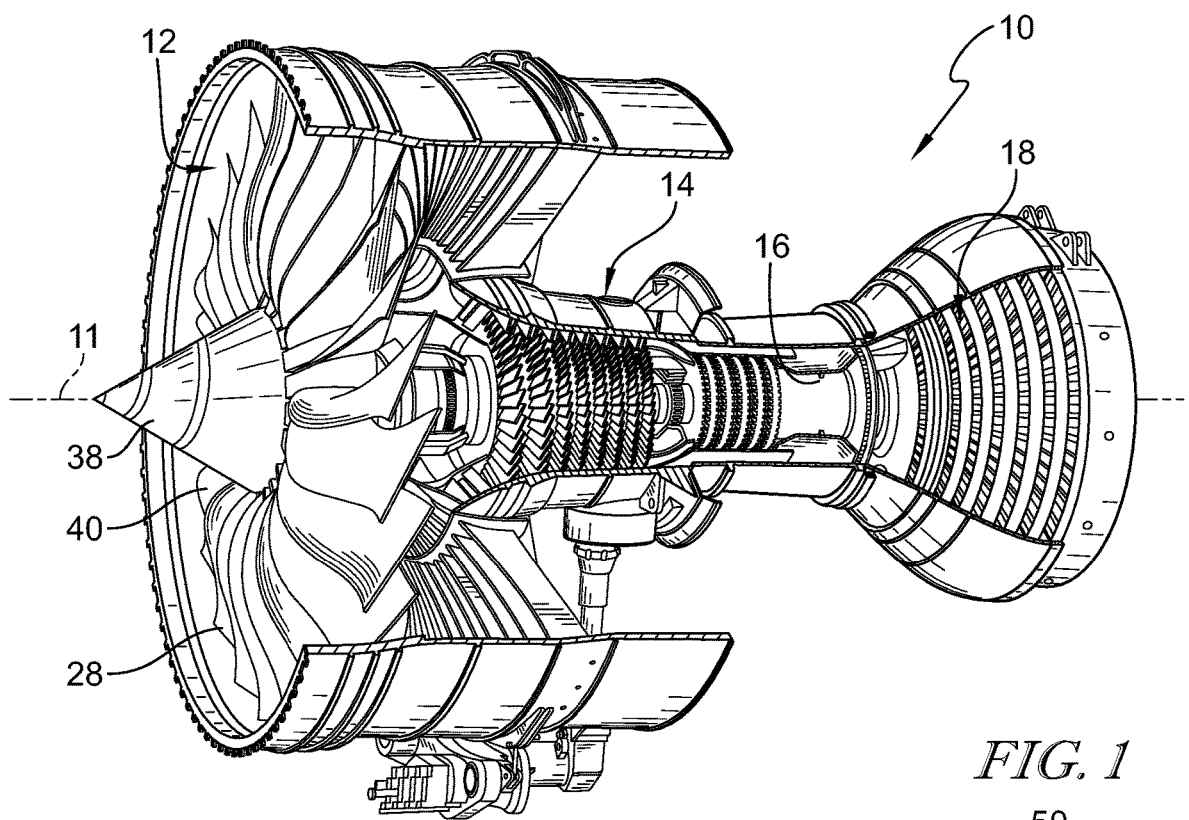
FIG. 1 is a cutaway view of a gas turbine engine that includes a fan, a compressor, a combustor, and a turbine, the fan including a plurality of fan blade assemblies mounted for rotation about an axis of the gas turbine engine to produce thrust.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown in FIG. 1. The gas turbine engine 10 includes a fan 12, a compressor 14, a combustor 16, and a turbine 18. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 to cause the turbine 18 to rotate about a center axis 11 of the gas turbine engine 10 and drive the compressor 14 and the fan 12.

The illustrative fan 12 includes a plurality of fan blade assemblies 40 extending from a hub 38 and that each include a fan blade 28. The fan blade assembly 40 is configured to rotate about the center axis 11 as suggested in FIG. 1 such that the fan blades 28 produce thrust. The fan blade assemblies 40 are arranged circumferentially about the center axis 11.

Figure 2:
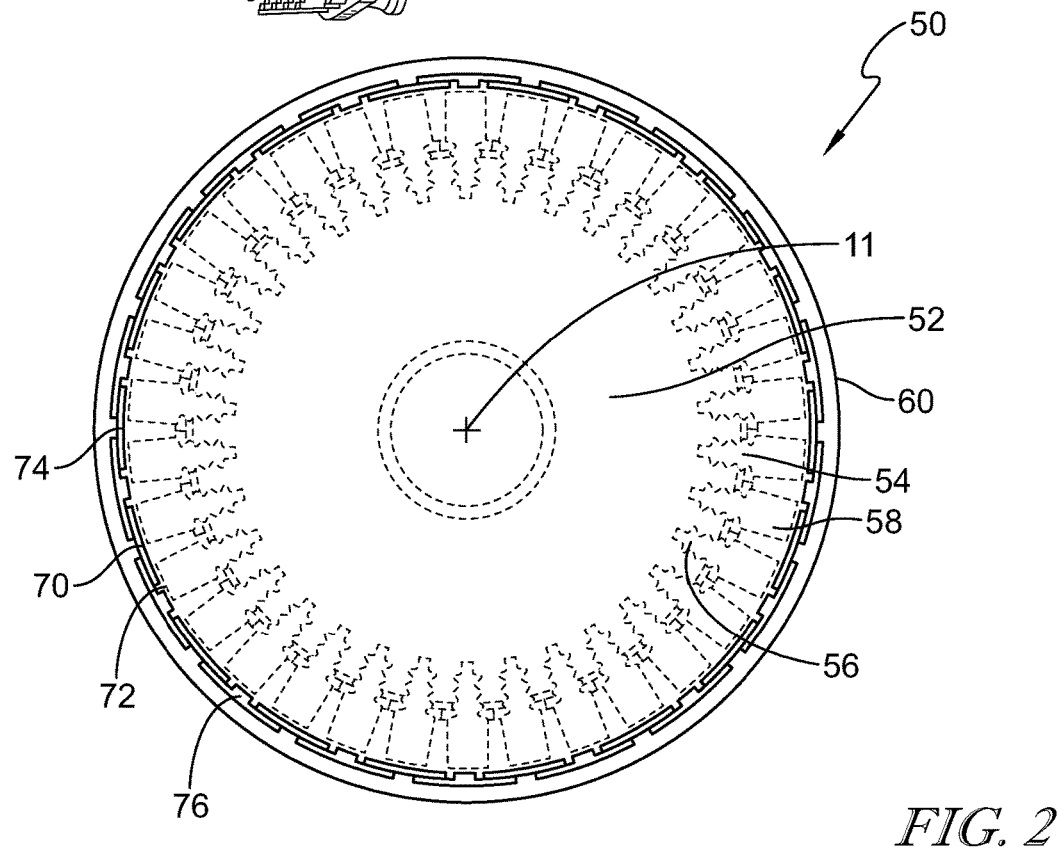
FIG. 2 is an axial view of a turbine segment of the turbine shown in FIG. 1.

Referring to FIG. 2, a turbine segment 50 of the turbine 18 includes a disk 52 that is centered about the center axis 11 and housed within a carrier 60 that extends circumferentially around the disk 52 and the central axis 11. A plurality of turbine blade assemblies 54 extend radially from the disk 52. In the illustrative embodiment, the turbine blade assemblies 54 include a root 56 that is secured in the disk 52 and a turbine blade 58 extending radially from the root 56.

A blade track 70 extends circumferentially around the radial outer ends 72 of each of the turbine blades 58. The blade track 70 includes a plurality of blade track segments 74 that collectively form the blade track 70. An inter-component seal 76 is positioned between each adjacent black track segment 74. Although the embodiments described herein are described with respect to blade track segments 74, it will be appreciated that the inter-component seals 76 may be utilized with seal segments, combustor tiles, turbine blades, nozzle guide vanes and/or vane segments, or any other suitable component. The present disclosure is applicable to vanes and other components and conceived with vanes in mind. The present disclosure is just as applicable to seal segments (blade tracks/shrouds) and other components used with gas turbine engines.

Inter-component sealing may be desired in ceramic matrix composite components to obtain the potential fuel burn savings offered by their higher temperature capability. Ceramic matrix composite materials may have lower thermal expansion coefficients and moderate mechanical strength compared with conventional metallic materials such as nickel alloys. Such differences in material properties between ceramic matrix composites and metals may create design challenges.

The present disclosure provides features that reduce leakage flow between ceramic matrix composite components. These features include flow discouragers, compressible seal elements, and choosing suitable seal surface area to use the secondary air system pressure to drive seal closure. An additional option may be to use a material with relatively high thermal expansion as an inter-component seal which compensates for the lower thermal expansion of the CMC Some conventional metallic blade track segments and other components use metallic strip seals which are reasonably effective. However such strip seals may not be effective or practical with ceramic matrix composite applications. As one example, ceramic matrix composite components may be difficult or expensive to machine such that machining conventional strip seals in ceramic matrix composite components may be less desirable. Machining conventional strip seal slots in ceramic matrix composite components may also form geometrical features (notches) in the edge of the component that serve as inter-laminar crack initiation sites which may be undesirable.

Figure 5:
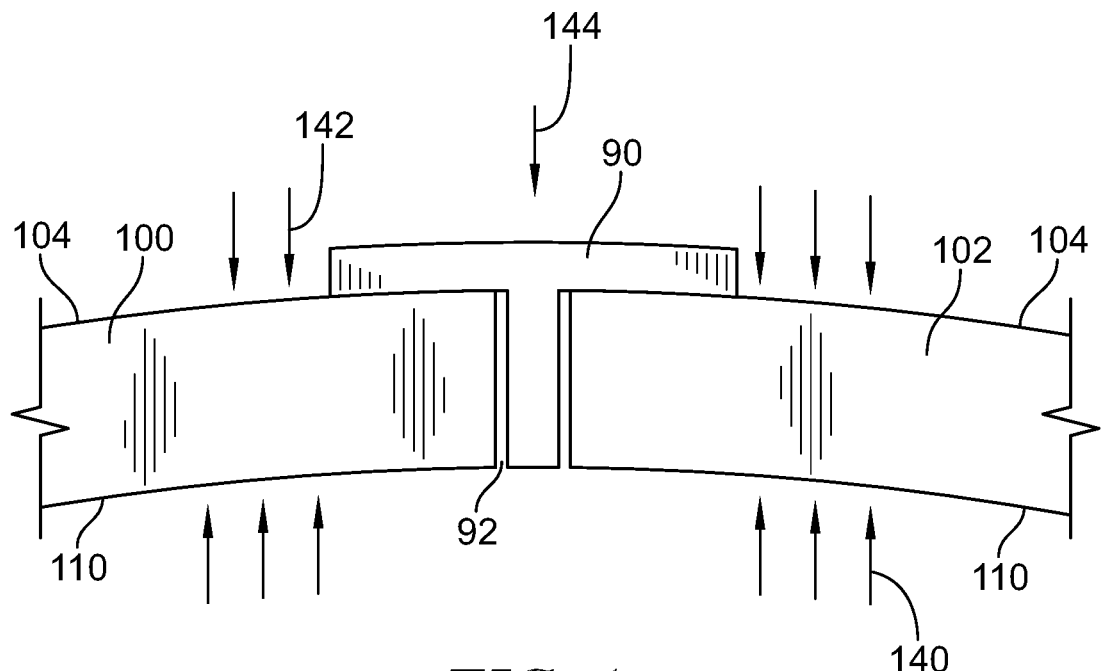
FIG. 5 is a cross-sectional view of the T-shaped seal coupled to the two blade track segments with the blade track segments in a retracted position.
Figure 6:
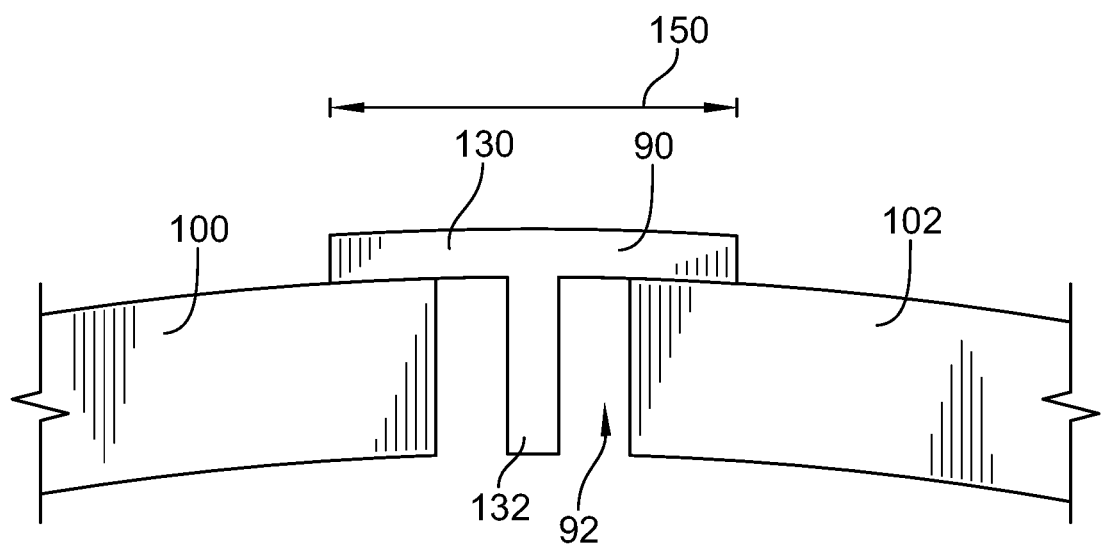
FIG. 6 is a cross-sectional view of the T-shaped seal coupled to the two blade track segments with the blade track segments in an expanded position.

Unlike conventional all metallic assemblies which tend to grow toward one another and "chock" as temperatures increase, metallic casing and ceramic matrix blade track assemblies may cause the ceramic matrix composite components to move away from each other circumferentially due to differential thermal expansion relative to the casing as suggested in FIGS. 5 and 6. Conventional strip seals used in such assemblies may not operate as effectively as in conventional all metallic assemblies because the strip seals may progressively disengage as temperatures increase.

The ceramic matrix composite components could be assembled in close proximity in a "chocked" or close to "chocked" condition at ambient temperatures in order to reduce the growth of gaps between the ceramic matrix composite components at operating temperatures. Assembly of such close fitting ceramic matrix composite components may cause accidental damage due to contact and forces between ceramic matrix composite components. The present disclosure provides sealing features without assembling the components in close proximity (chocked) at assembly.

The seals designs described in the present disclosure represent a variety of solutions to the desire to minimize inter-platform or inter-blade track (also referred to wedge face) leakage of higher pressure secondary air into the gas path. They may provide sealing in the event of adverse localized differential pressure that may promote flow in the opposite direction from the gas path into the secondary air system. The principle of operation of the present disclosure can be applied to other ceramic and ceramic matrix composite components such as seal segments, combustor tiles or turbine blades.

Figure 3:
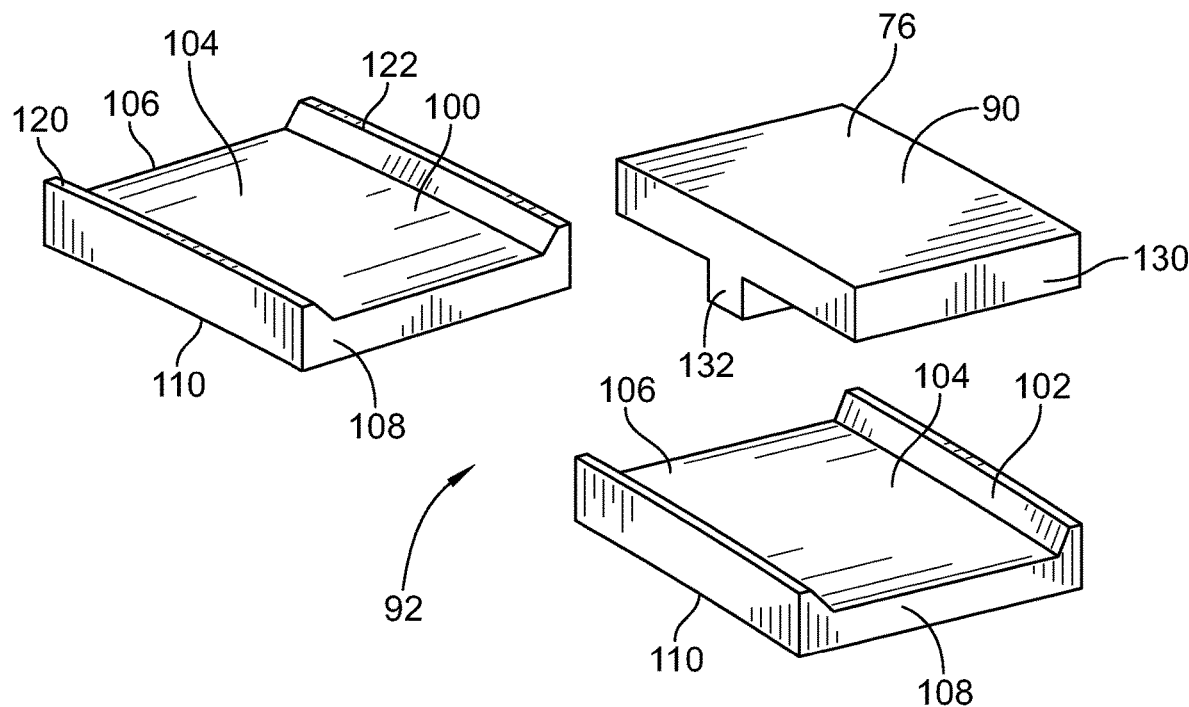
FIG. 3 is an exploded view of two blade track segments included in the turbine of FIG. 2 that are configured to be sealed with a T-shaped seal.

A first embodiment of a seal 76 in the form of a T seal 90 uses the external pressure from the secondary air system to close up the circumferential seal gap 92 as shown in FIGS. 3-6. Referring to FIG. 3, the seal 90 is configured to be positioned in a circumferential seal gap 92 formed between a first component 100 and a second component 102. Each of the first component 100 and the second component 102 includes a radially outer surface 104 extending between a first end 106 and a second end 108, and an opposite radially inner surface 110 extending between the first end 106 and the second end 108. Illustratively, the first and second components 100, 102 are blade track segments 74. In other embodiments, the first and second components 100, 102 are nozzle guide vane platforms.

An upstream ridge 120 and a downstream ridge 122 extend radially outward from the radially outer surface 104.

The upstream ridge 120 and the downstream ridge 122 extend between the first end 106 and the second end 108. The radially outer surface 104 extends between the upstream ridge 120 and the downstream ridge 122.

Figure 4:
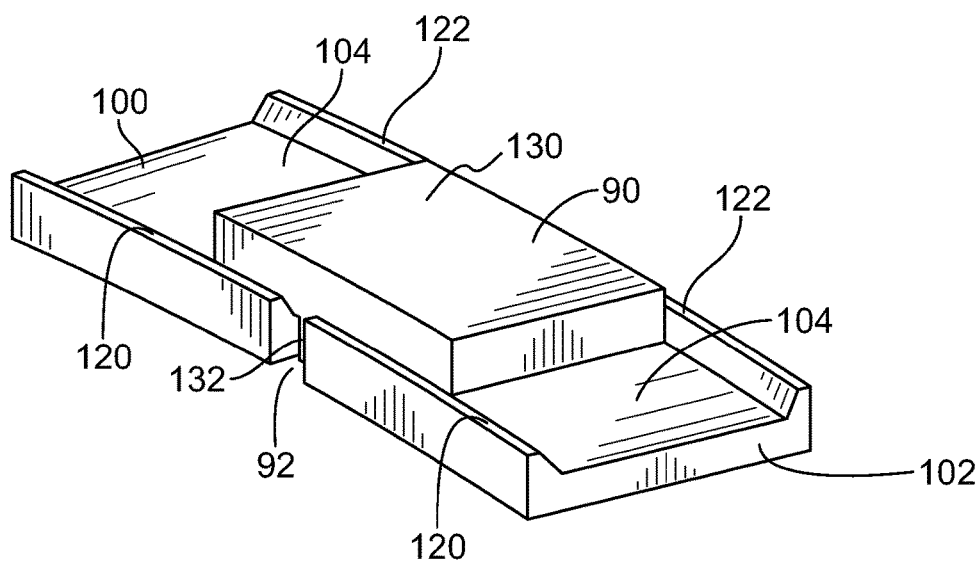
FIG. 4 is a perspective view of the T-shaped seal coupled to the two blade track segments.

The seal 90 includes an outer segment 130 and a radial segment 132 extending radially inward from the outer segment 130. As illustrated in FIG. 4, the outer segment 130 is configured to rest on the radially outer surface 104 between the upstream ridge 120 and the downstream ridge 122 of the first component 100 and the second component 102. The radial segment 132 of the seal 90 positions within the circumferential seal gap 92.

Referring now to FIG. 5, a gas path 140 is formed along the radially inner surfaces 110 of the first component 100 and the second component 102. A cooling air/bleed air flowpath 142 from the compressor 14 is formed along the radially outer surfaces 104 of the first component 100 and the second component 102. The cooling air flowpath 142 generally has a higher pressure than the gas path 140, which urges the seal 90 in the direction of arrow 144 radially inward toward the components 100, 102.

As illustrated in FIG. 6, the components 100, 102 move apart due to the thermal expansion coefficients of the metal carrier 60 and the ceramic matrix composite components 100, 102. The outer segment 130 of the seal 90 has a length 150 that maintains the seal of the gap 92 when the components 100, 102 move apart.

Figure 7:
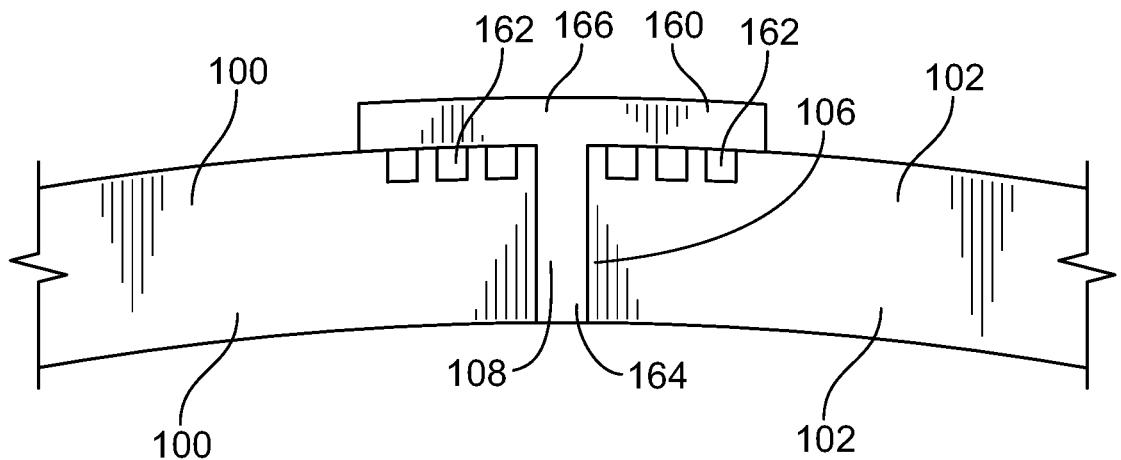
FIG. 7 is a cross-sectional view of the T-shaped seal coupled to two blade track segments having flow discouragers.

FIG. 7 illustrates a second embodiment of a seal 76 that is a T seal 160 similar to the T seal 90. Seal 160 further includes flow discouragers 162 in the form of grooves machined into the surface of the components 100, 102. In such an embodiment, the radial segment 164 of the seal 160 sits flush between the first end 106 of the component 102 and the second end 108 of the component 100. The outer segment 166 of the seal 160 sits over the grooves 162 formed in the components 100, 102. The grooves 162 create turbulent air flow which discourages airflow through the seal 160.

In other embodiments, the grooves 162 are formed in the seal 160 and extend radially outward into the seal 160. Seals 160 formed with grooves 162 may be used with components 100, 102 having grooves 162 or with components 100, 102 not having grooves 162. As an example, seals 160 formed with grooves 162 may avoid machining into the ceramic matrix composite components 100, 102 when the components 100, 102 do not include grooves 162. Seals 160 formed with grooves 162 could be cast, metal injection molded, or formed by any other suitable method.

Figure 8:
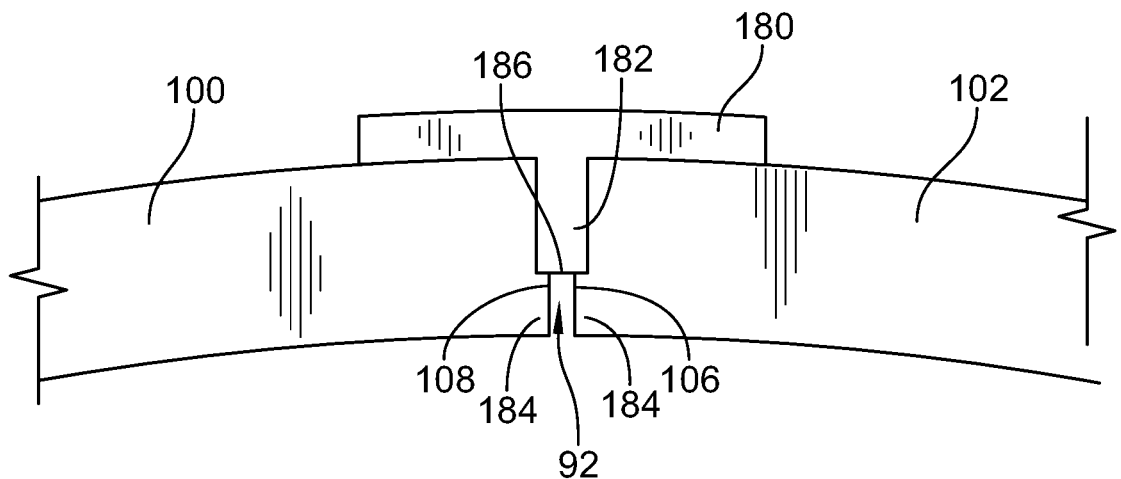
FIG. 8 is a cross-sectional view of another embodiment of a T-shaped seal coupled to the two blade track segments.
Figure 9:
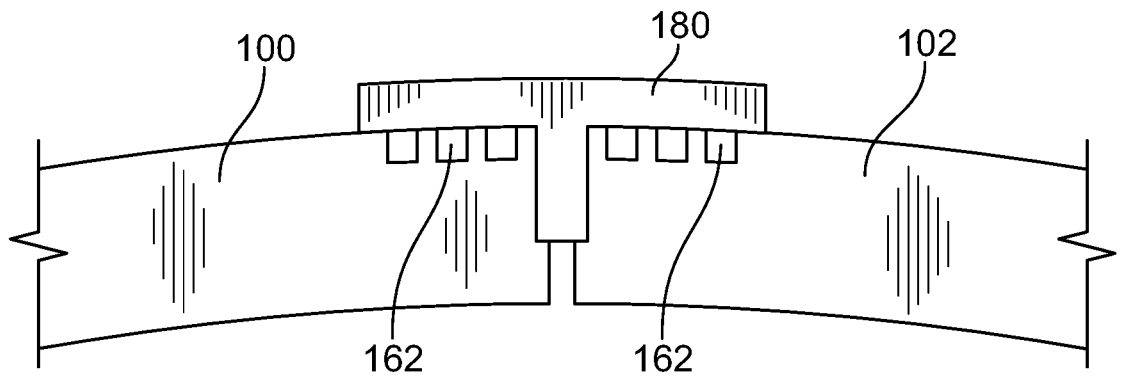
FIG. 9 is a cross-sectional view of the embodiment of the T-shaped seal shown in FIG. 8 coupled to two blade track segments having flow discouragers.

Another embodiment of a seal 76, shown in FIG. 8, is a T seal 180 having a shortened radial segment 182 that has a length that is less than a depth of the gap 92. In such an embodiment, flanges 184 are formed on the ends 106, 108 of the components 100, 102. The flanges 184 extend toward one another and contact the base 186 of the radial segment 182 so that the base 186 of the seal 180 is protected from direct contact with the gas flow. In some embodiments, the seal 180 may be a metallic seal rather than a ceramic matrix composite seal. Referring to FIG. 9, the seal 180 may also be used with flow discouragers 162 formed in the components 100, 102.

In all cases, the T shaped seal may be formed by 2D laid up fabric or by 3D weaving or from a monolithic ceramic such as silicon carbide or silicon nitride or alumina or from a metallic material such as a nickel or cobalt based high temperature alloy.

Figure 10:
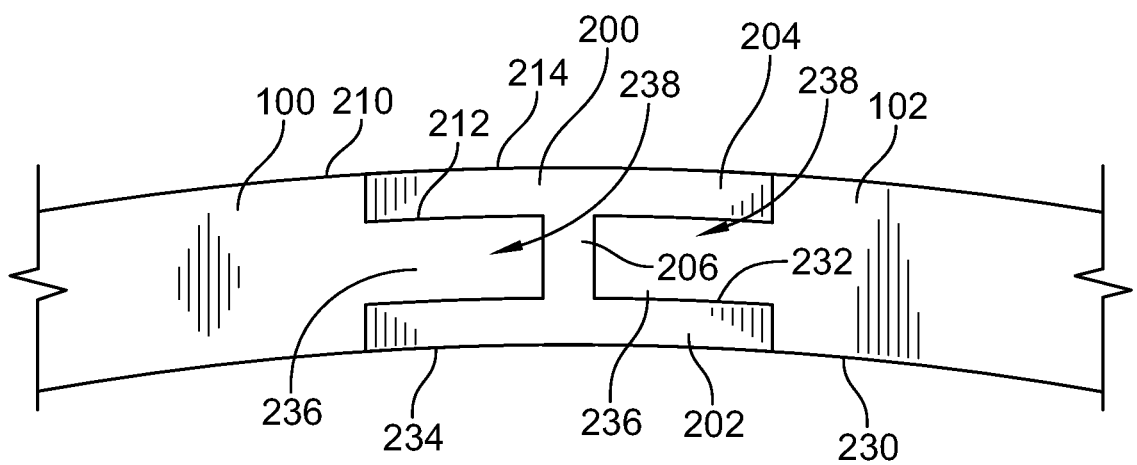
FIG. 10 is a cross-sectional view of an H-shaped seal coupled between the two blade track segments.

Referring to FIG. 10, another embodiment of a seal 76 is an H-shaped seal 200 having an inner segment 202 coupled to an outer segment 204 by a radial segment 206. The radial segment 206 sits within the gap 92. The components 100, 102 include an outermost surface 210 and an outer surface 212 that is stepped inward from the outermost surface 210. The outer segment 204 of the seal 200 is configured to sit on the outer surface 212 so that an end surface 214 of the outer segment 204 is flush with the outermost surface 210 of the components 100, 102.

Further, the components 100, 102 include an innermost surface 230 and an inner surface 232 that is stepped inward from the innermost surface 230. The inner segment 202 of the seal 200 is configured to sit on the inner surface 232 so that an end surface 234 of the inner segment 202 is flush with the innermost surface 230 of the components 100, 102. In general, tongues 236 from the two components 100, 102 engage in the grooves 238 formed by the seal 200. Secondary air pressure causes the upper seal gap to close up, therefore the performance of the seal 200 should be an improvement over the T style seal due to the increase path length for air leakage.

Figure 11:
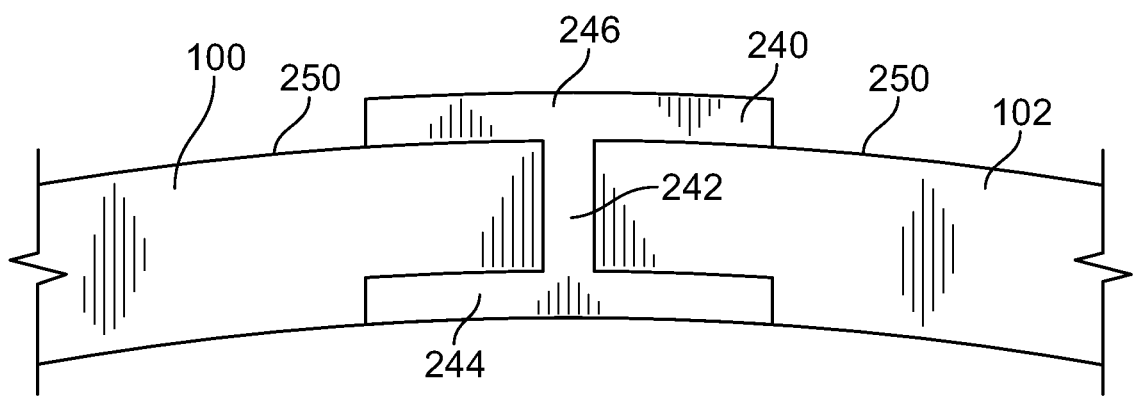
FIG. 11 is a cross-sectional view of another embodiment of an H-shaped seal coupled to the two blade track segments.
Figure 12:
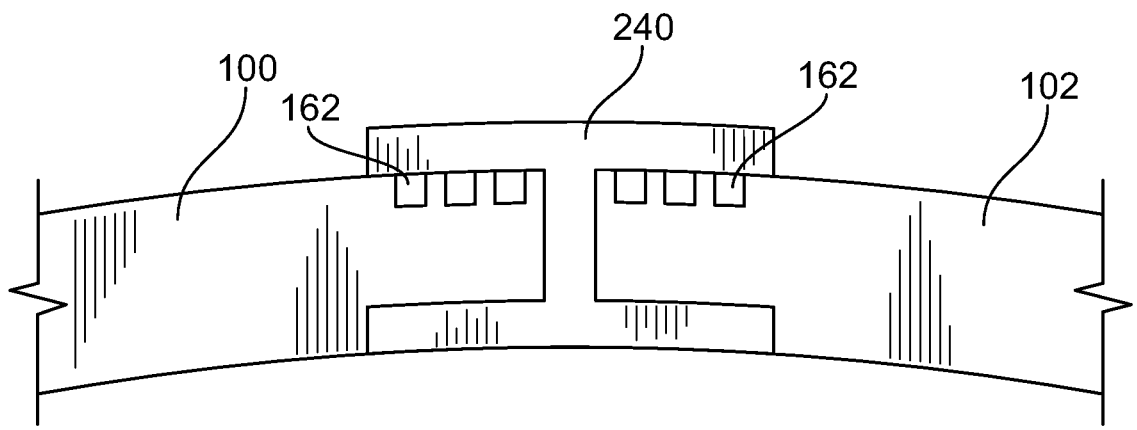
FIG. 12 is a cross-sectional view of the embodiment of the H-shaped seal shown in FIG. 11 coupled to two blade track segments having flow discouragers.

In the embodiment shown in FIG. 11, an H-seal 240 is similar to the seal 200. In such an embodiment, the components 100, 102 do not include the stepped inward outer surface. Accordingly, a radial segment 242 between an inner segment 244 of the seal 240 and an outer segment 246 of the seal 240 is longer so that the outer segment 246 of the seal 240 rests entirely on an outermost surface 250 of the components 100, 102. As shown in FIG. 12, flow discouragers 162 may be utilized with the seal 240.

In other embodiments, the flow discouragers 162 are formed in the seal 240. The flow discouragers 162 may extend radially outward into the outer segment 204 and/or radially inward into the inner segment 202. Seals 240 formed with flow discouragers 162 may be used with components 100, 102 having flow discouragers 162 or with components 100, 102 not having flow discouragers 162. As an example, seals 240 formed with flow discouragers 162 may avoid machining into the ceramic matrix composite components 100, 102 when the components 100, 102 do not include flow discouragers 162. Seals 240 formed with flow discouragers 162 could be cast, metal injection molded, or formed by any other suitable method.

In all cases, the H shaped seal may be formed by 2D laid up fabric formed to avoid delamination by the effects of the notches or by 3D weaving or from a monolithic ceramic such as silicon carbide or silicon nitride or alumina or from a metallic material such as a nickel or cobalt based high temperature alloy.

Figure 13:
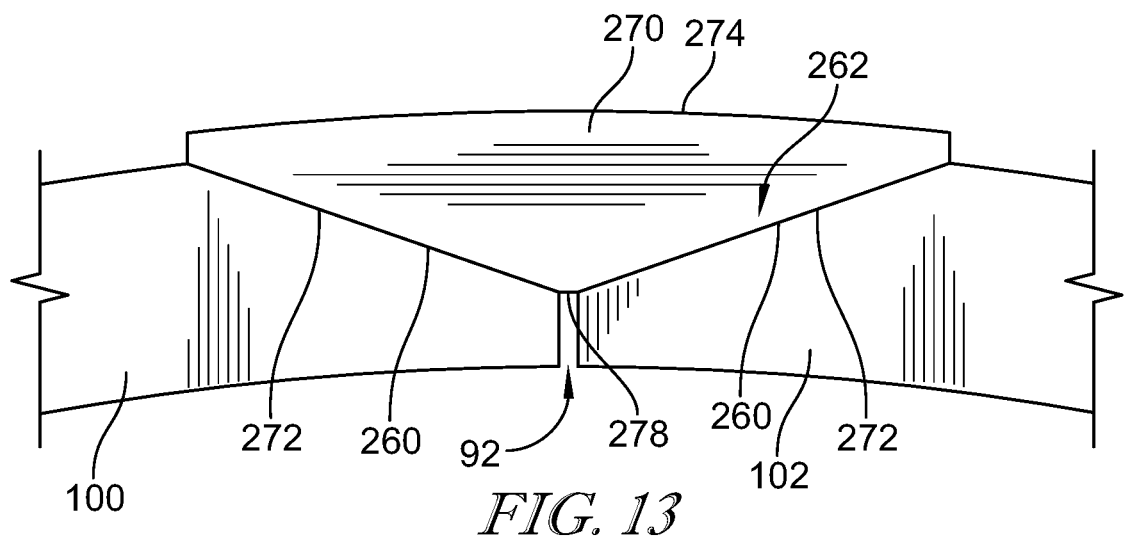
FIG. 13 is a cross-sectional view of a wedge-shaped seal coupled to the two blade track segments.

FIG. 13 illustrates an embodiment of the two components 100, 102 having angled ends 260. The angled ends 260 are positioned adjacent one another to form a wedge 262. A seal 76 in the form of a wedge seal 270 is positioned within the wedge 262. The seal 270 includes a pair of angled ends 272 and an outermost end 274 extending from the angled ends 272. The angled ends 272 sit flush against the angled ends 260 of the components 100, 102. The outermost end 274 extends radially outward from an outer surface 276 of the components 100, 102. The angled ends 272 meet at an innermost end 278 that sits within the gap 92.

The ceramic matrix composite angle block seal 270 uses secondary air system pressure to promote sealing on the surface of the vane platform. This geometry avoids creating a stress concentration in the corner of a rebate or tongue in the ceramic matrix composite. It may be possible to create such geometry during ceramic matrix composite manufacture via ply drops in the interior of the ceramic matrix composite and drape the external ply to form the angle.

Figure 14:
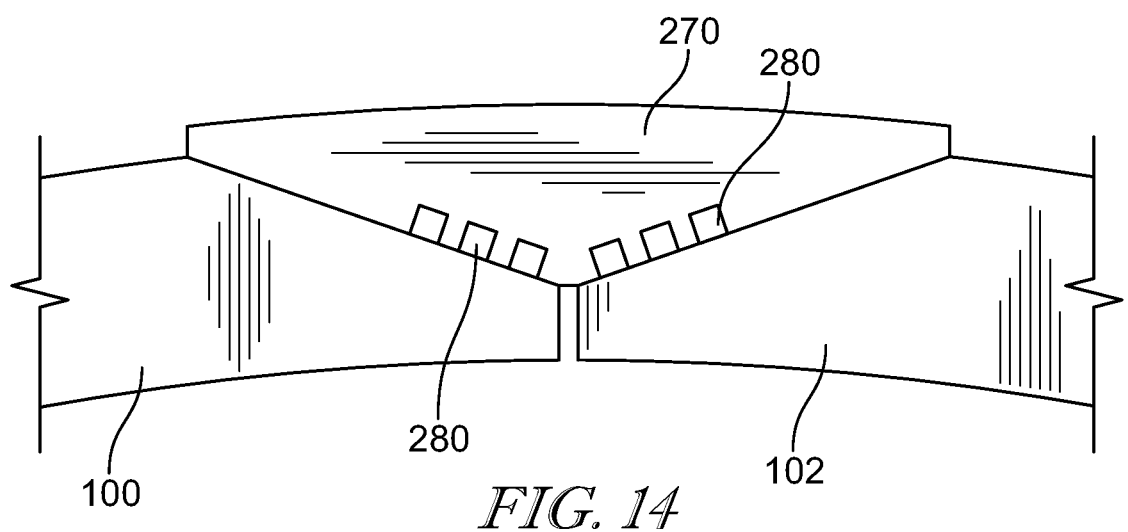
FIG. 14 is a cross-sectional view of the wedge-shaped seal shown in FIG. 13 coupled to two blade track segments having flow discouragers.
Figure 15:
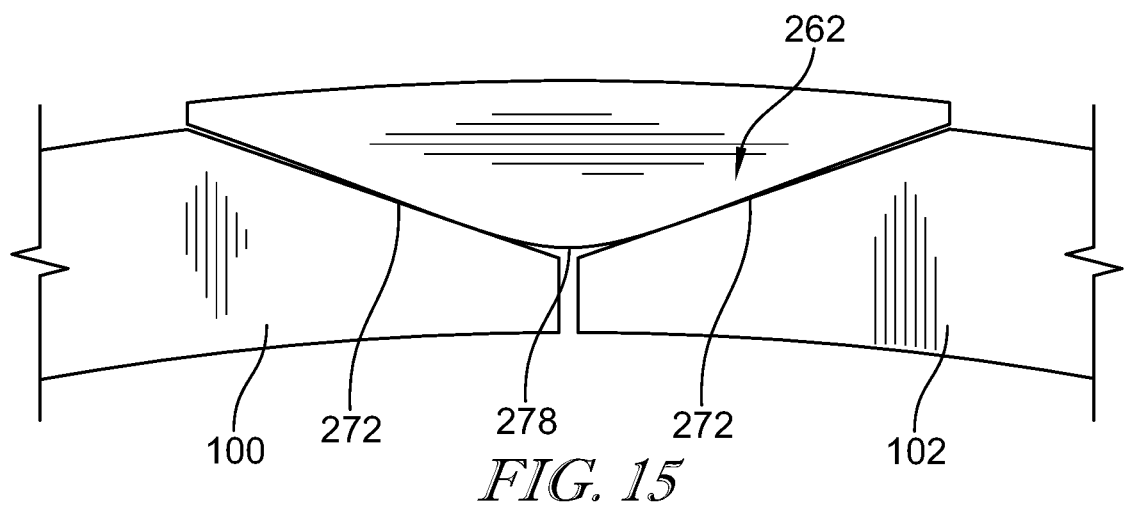
FIG. 15 is a cross-sectional view of another embodiment of a wedge-shaped seal coupled to the two blade track segments.

Notably, as illustrated in FIG. 14, flow discouragers 280 may be formed in the seal 270 to create turbulence that blocks the flow of air through the seal 270. Additionally, the angled ends 272 of the seal 270 and the innermost end 278 of the seal 270 may be rounded, as shown in FIG. 15, to enable the seal 270 to rock within the wedge 262. This allows for some differential movement between the two components 100, 102 through thermal/pressure cycles.

In all cases, the angle block seal and curved block may be formed by 2D laid up fabric or by 3D weaving or from a monolithic ceramic such as silicon carbide or silicon nitride or alumina or from a metallic material such as a nickel or cobalt based high temperature alloy.

Figure 16:
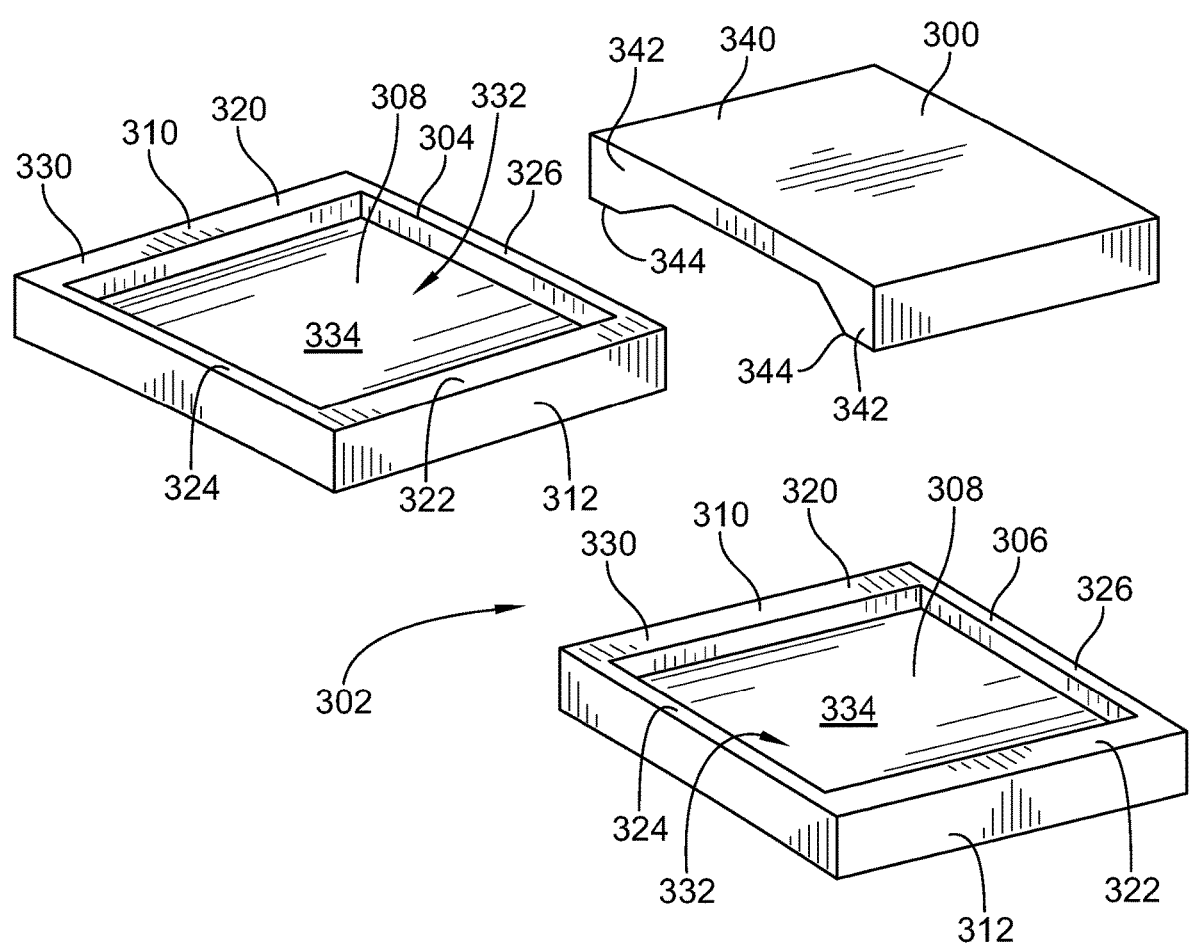
FIG. 16 is an exploded view of another embodiment of the two blade track segments configured to be sealed with a saddle-shaped seal.

Referring to FIG. 16, a seal 300 is configured to position over a circumferential seal gap 302 formed between a first component 304 and a second component 306. Each of the first component 304 and the second component 306 includes a radially outer surface 308 extending between a first end 310 and a second end 312, and an opposite radially inner surface 314 extending between the first end 310 and the second end 312.

The first end 310 includes a ridge 320 and the second end 312 includes a ridge 322. The ridges 320 and 322 extend radially outward from the radially outer surface 308. An upstream ridge 324 and a downstream ridge 326 extend radially outward from the radially outer surface 308. The upstream ridge 324 and the downstream ridge 326 extend between the ridge 320 and the ridge 322 to form a brim 330 that surrounds a cavity 332 having a bottom 334 formed by the radially outer surface 308.

Figure 17:
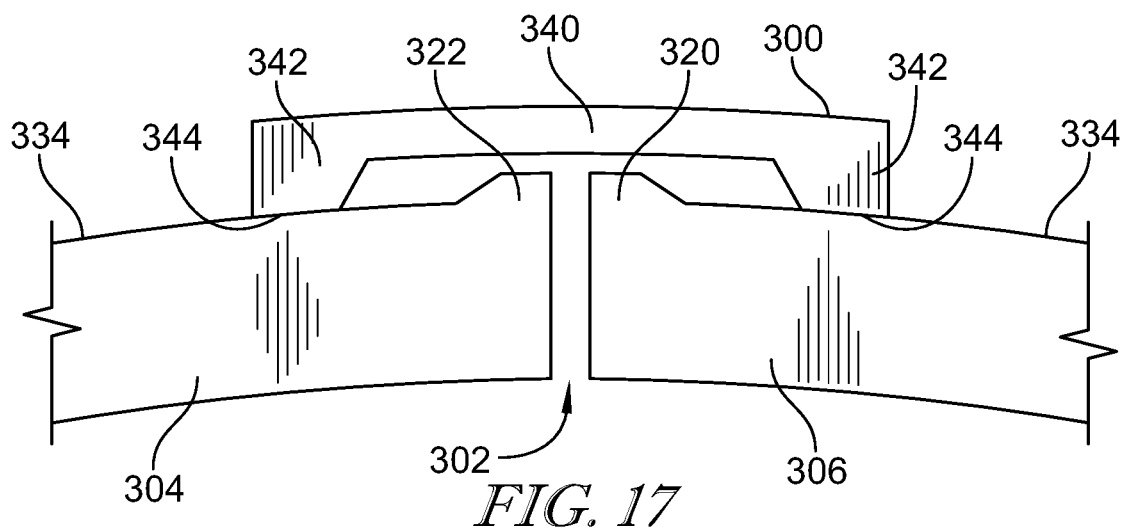
FIG. 17 is a cross-sectional view of the saddle-shaped seal coupled to the two blade track segments shown in FIG. 16.

The seal 300 includes a base segment 340 and a pair of flanges 342 extending radially inward from the base segment 340. The flanges 342 include flat ends 344 that are configured to rest on the bottom 334 of the cavity 332, as illustrated in FIG. 17. The seal 300 straddles the joint between the components 304, 306, and includes a large area subject to secondary air pressure resulting in a high closing force and therefore an effective seal.

Figure 18:
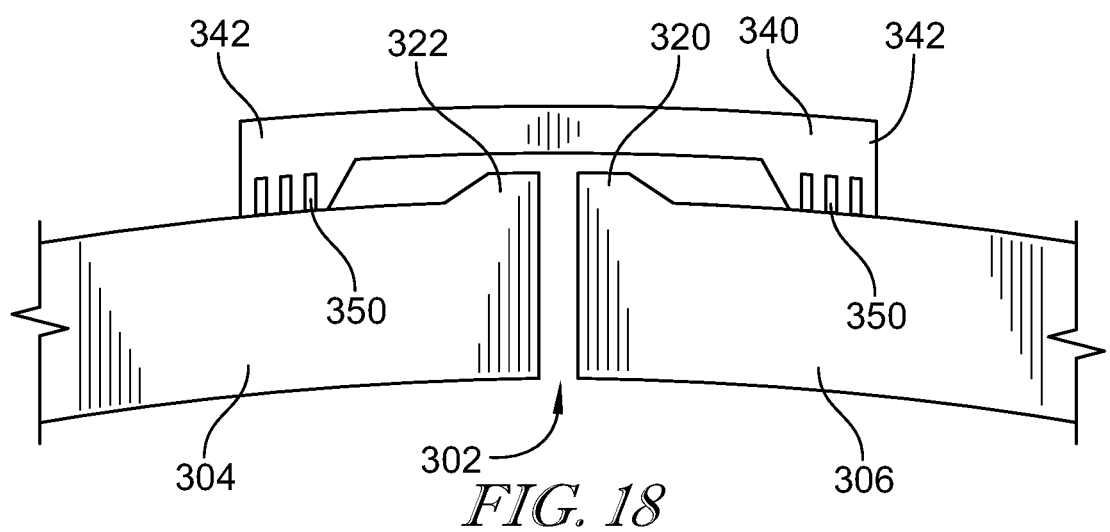
FIG. 18 is a cross-sectional view of another embodiment of the saddle-shaped seal coupled to the two blade track segments shown in FIG. 16.
Figure 19:
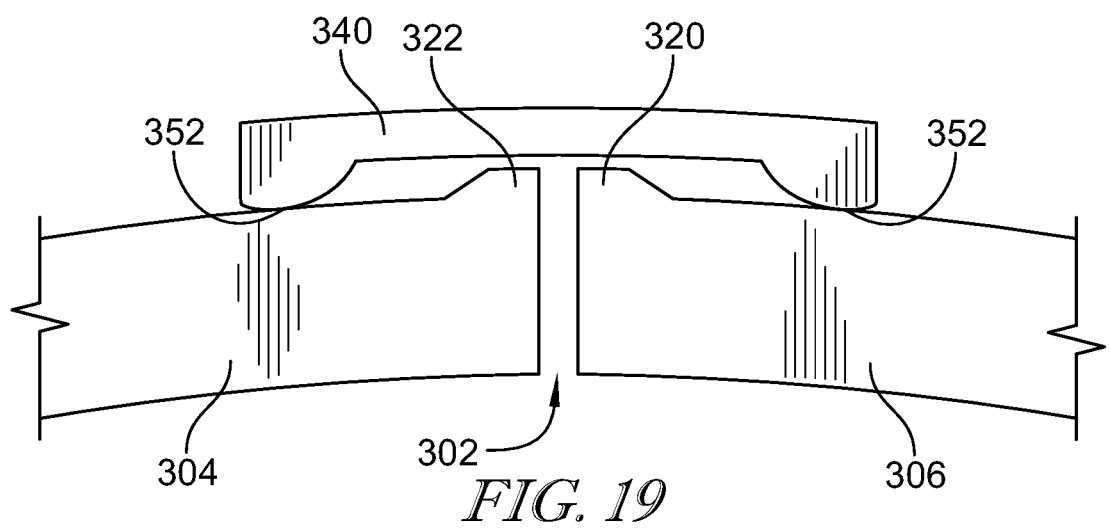
FIG. 19 is a cross-sectional view of yet another embodiment of the saddle-shaped seal coupled to the two blade track segments shown in FIG. 16.

In the embodiment shown in FIG. 18, the flanges 342 of the seal 300 may include channels 350 (or flow discouragers) that create turbulent air flow. Additionally, in the embodiment shown in FIG. 19, the seal 300 may include contact surfaces 352 that are barreled to allow articulation in order to accommodate relative movement between the two components 304, 306.

In any case, the cover seal 300 may be formed by 2D laid up fabric or by 3D weaving or from a monolithic ceramic such as silicon carbide or silicon nitride or alumina or from a metallic material such as a nickel or cobalt based high temperature alloy.

Figure 20:
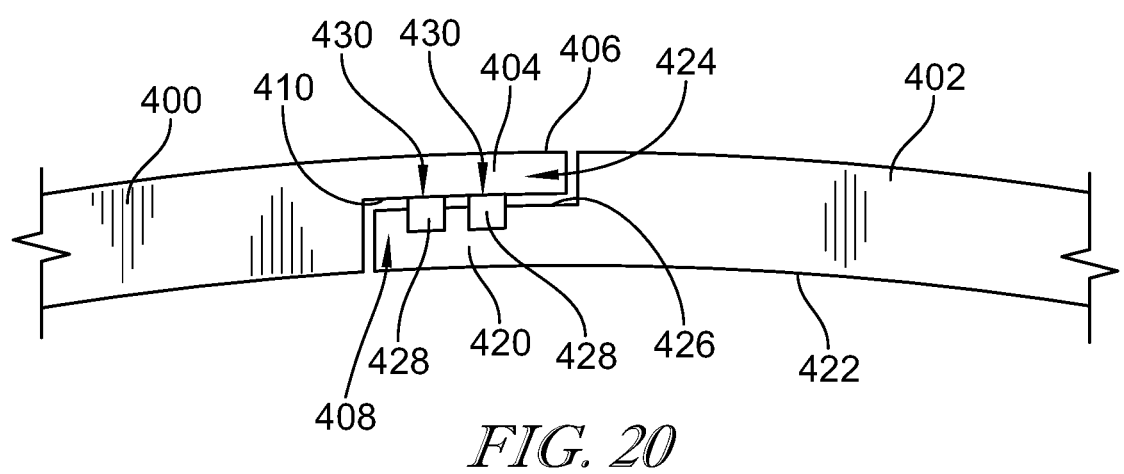
FIG. 20 is a cross-sectional view of yet another seal configured to couple two blade track segments.

Referring to FIG. 20, a seal includes a tongue and groove configuration in the first component 400 and the second component 402. The first component 400 includes an outer tongue 404 extending along an outermost surface 406 of the component 400. A groove 408 is defined radially inward from the tongue 404 and extends along an inner surface 410 of the tongue 404.

The second component 402 includes an inner tongue 420 extending along an innermost surface 422 of the component 402. A groove 424 is defined radially outward from the tongue 420 and extends along an outer surface 426 of the tongue 420. The tongue 420 includes slots 428 extending from openings 430 in the outer surface 426.

The outer tongue 404 is configured to position within the groove 424 so that the inner tongue 423 positions within the groove 408 with the inner surface 410 of the tongue 404 positioned adjacent the outer surface 426 of tongue 420. A pair of seals 430 are positioned within the slots 428 and contact the inner surface 410 of the tongue 404 to seal the first component 400 to the second component 402.

The sealing features of the present disclosure may avoid slots being machined into the ceramic matrix composite components. In some embodiments with slot geometries, the slot geometries are formed on separate seal elements that can have dedicated machining operation. The sealing features of the present disclosure may use pressure differential between the secondary air (at higher pressure) and the gas path (at lower pressure) to encourage seal closure.

Some embodiments of the seal designs of the present disclosure offer a degree of articulation between ceramic matrix composite components, which may reduce the level of leakage under differential movement. Some seal designs such as those shown in FIGS. 8, 9, and 13-20 may keep the seal element away from direct contact with the gas path, allowing the use of lower temperature capability, but higher strength nickel or cobalt alloys to be used as the material of the seals. Sealing faces may be rounded to encourage seal-component line-contact, improving tolerance to component relative movement/twisting. 3D woven structures may be woven and/or fully consolidated as a relatively long extrusion and then sliced into appropriate lengths.

The features of the present disclosure may be applicable to any ceramic and ceramic matrix composite components used in gas turbines which use high OPR/high TET to obtain high thermal efficiency. The broader manufacturing approach of the present disclosure may be applied to any complex ceramic matrix composite structure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising a first component comprising ceramic matrix composite materials, the first component having a first radial outer surface that extends circumferentially partway around an axis and a first circumferential end face that extends radially inward from the first radial outer surface toward the axis, a second component comprising ceramic matrix composite, the second component having a second radial outer surface that extends circumferentially partway around the axis and a second circumferential end face that extends radially inward from the second radial outer surface toward the axis, and the second circumferential end face facing being spaced apart circumferentially from the first circumferential end face of the first component to define a gap therebetween, and a seal configured to block gases from flowing axially and radially between the first component and the second component, the seal includes an outer segment and a radial segment, the outer segment extends circumferentially along the first radial outer surface across the gap and along the second radial outer surface to allow for changes in a size of the gap due to thermal growth of the gas turbine engine assembly and the radial segment extends radially inward from the outer segment into the gap, wherein the first component includes a radial innermost surface that is spaced apart radially from the first radial outer surface toward the axis, the seal includes an outer end and an inner end that is spaced apart radially from the outer end, and the inner end is radially flush with the radial innermost surface of the first component.

2. The gas turbine engine assembly of claim 1, wherein the seal is T-shaped when viewed axially relative to the axis.

3. The gas turbine engine assembly of claim 2, wherein the first circumferential end face is planar and extends between and contacts directly the first radial outer surface and the radial innermost surface of the first component.

4. The gas turbine engine assembly of claim 2, wherein the first radial outer surface is formed to define a plurality of first channels that extend radially into the first component, the second radial outer surface is formed to define a plurality of second channels that extend radially into the second component, and the outer segment of the seal covers the plurality of first channels and the plurality of second channels.

5. The gas turbine engine assembly of claim 1, where the seal is H-shaped when viewed axially relative to the axis.

6. The gas turbine engine assembly of claim 5, wherein the seal includes an outer end and an inner end that is spaced apart radially from the outer end, and the inner end is radially flush with the radial innermost surface of the first component.

7. The gas turbine engine assembly of claim 6, wherein the first radial outer surface is the outermost surface of the first component in a radial direction relative to the axis.

8. The gas turbine engine assembly of claim 7, wherein the first radial outer surface is formed to define a plurality of first channels that extend radially into the first component, the second radial outer surface is formed to define a plurality of second channels that extend radially into the first component, and the outer segment of the seal covers the plurality of first channels and the plurality of second channels.

9. The gas turbine engine assembly of claim 5, wherein the seal further includes an inner segment spaced apart radially from the outer segment and the radial segment extends between and connects directly the inner segment and the outer segment.

10. The gas turbine engine assembly of claim 1, wherein the first radial outer surface is formed to define a plurality of first channels that extend radially into the first component toward the axis, the second radial outer surface is formed to define a plurality of second channels that extend radially into the first component toward the axis, and the outer segment of the seal covers the plurality of first channels and the plurality of second channels.

11. The gas turbine engine assembly of claim 1, wherein the first radial outer surface is the outermost surface of the first component in a radial direction relative to the axis.

12. The gas turbine engine assembly of claim 1, wherein the first component includes a fore ridge and an aft ridge spaced apart axially from the fore ridge, the fore ridge and the aft ridge extend radially outward away from the first radial outer surface, the fore ridge extends circumferentially between a first end and a second end of the first component, and the aft ridge extends circumferentially between the first end and the second end of the first component.

13. A gas turbine engine assembly comprising
a first component comprising ceramic matrix composite materials, the first component extends circumferentially between a first end and second end thereof relative to an axis,
a second component comprising ceramic matrix composite materials, the second component extends circumferentially between a first end and second end thereof relative to the axis, and the first end of the second component is spaced apart circumferentially from the second end of the first component to define a gap therebetween, and
a seal configured to block gases from flowing between the first component and the second component, the seal includes an outer segment, a first leg segment, and a second leg segment, the outer segment extends circumferentially over the first radial outer surface, across the gap, and over the second radial outer surface, the first leg segment extends radially inward from the outer segment toward the axis and engages the first component, the second leg segment is spaced apart circumferentially from the first leg segment, and the second leg segment extends radially inward from the outer segment toward the axis and engages the second component,
wherein the first leg segment is formed to include a first channel that extends radially outward into the first leg segment, the second leg segment is formed to include a second channel that extends radially outward into the second leg segment, the first component covers the first channel, and the second component covers the second channel.

14. A gas turbine engine assembly comprising
a first component comprising ceramic matrix composite materials, the first component extends circumferentially between a first end and second end thereof relative to an axis,
a second component comprising ceramic matrix composite materials, the second component extends circumferentially between a first end and second end thereof relative to the axis, and the first end of the second component is spaced apart circumferentially from the second end of the first component to define a gap therebetween, and
a seal configured to block gases from flowing between the first component and the second component, the seal includes an outer segment, a first leg segment, and a second leg segment, the outer segment extends circumferentially over the first radial outer surface, across the gap, and over the second radial outer surface, the first leg segment extends radially inward from the outer segment toward the axis and engages the first component, the second leg segment is spaced apart circumferentially from the first leg segment, and the second leg segment extends radially inward from the outer segment toward the axis and engages the second component,
wherein the first leg segment includes a mating surface that engages the first component, the second leg segment includes a mating surface that engages the second component, and the mating surface of the first leg segment and the mating surface of the second leg segment are curvilinear to allow the seal to remain engaged with the first and second components in response to relative radially radial movement between the first component and the second component.

15. The gas turbine engine assembly of claim 13, wherein the first component includes a radial outer surface that engages the first leg segment and an axially extending ridge located at the second end of the first component and the axially extending ridge further extends radially outward away from the first radial outer surface toward the outer segment of the seal into a space defined circumferentially between the first leg segment and the second leg segment.

16. The gas turbine engine assembly of claim 15, wherein the first leg segment is spaced apart circumferentially from the axially extending ridge to allow the first component to move circumferentially relative to the second component.

17. The gas turbine engine assembly of claim 15, wherein the first component includes a fore ridge and an aft ridge spaced apart axially from the fore ridge, the fore ridge and the aft ridge extend radially outward away from the first radial outer surface, the fore ridge extends circumferentially between the first end and the second end of the first component, and the aft ridge extends circumferentially between the first end and the second end of the first component.

\* \* \* \* \*